United States Patent [19]
Brkovic

[11] Patent Number: 6,141,231
[45] Date of Patent: Oct. 31, 2000

[54] BOARD MOUNTABLE POWER SUPPLY MODULE WITH CURRENT SHARING CIRCUIT AND A METHOD OF CURRENT SHARING BETWEEN PARALLEL POWER SUPPLIES

[75] Inventor: Milivoje Slobodan Brkovic, Carlsbad, Calif.

[73] Assignee: Lucent Technologies Inc., Murray Hill, N.J.

[21] Appl. No.: 09/350,840

[22] Filed: Jul. 9, 1999

[51] Int. Cl.[7] .................................................. H02M 7/00
[52] U.S. Cl. .............................................................. 363/72
[58] Field of Search .................................... 363/720, 144, 363/147

[56] References Cited

U.S. PATENT DOCUMENTS 4,886,981  12/1989  Lentini et al. .............................. 307/87

Primary Examiner—Shawn Riley
Attorney, Agent, or Firm—Craig J. Cox

[57] ABSTRACT

A circuit and a method for providing current sharing between parallel power supplies using a modified master/slave scheme in which any of the parallel modules can be designated the master is described. A current-share circuit is incorporated into each power supply which includes its own controller producing an internal control signal and is interconnected to the other power supply modules on a current-share bus. The current-share circuit includes a switch, which is operable to connect the power supplies internal control signal to the current-share bus when closed and disconnect the internal control signal from the current-share bus when open. The switch is controlled by master/slave logic, which determines whether the power supply is the master or a slave and controls the switch accordingly. The master is determined by closing all of the switches, thereby placing all of the power supplies' internal control signals on the bus. The power supply whose control signal reaches the bus first is determined to be the master and the switches for all of the other parallel power supplies are then opened by the master/slave logic designating them as slaves.

17 Claims, 4 Drawing Sheets

BOARD MOUNTABLE POWER SUPPLY MODULE WITH CURRENT SHARING CIRCUIT AND A METHOD OF CURRENT SHARING BETWEEN PARALLEL POWER SUPPLIES

TECHNICAL FIELD OF THE INVENTION

The present invention relates to power supplies. Specifically, the present invention is a board mountable power supply including a current sharing circuit and a method of current sharing between parallel power supplies.

BACKGROUND OF THE INVENTION

More and more electronic applications are requiring distributed power architectures where the current requirements of the electrical loads are requiring the power supplies to be moved as close to the load as practicable. Instead of the single power supply which would accept ac line voltage and produce a dc or ac output voltage for use by an entire electrical system, today's ultra-fast electronics and electrical components often require their own power supply to accommodate the high transients in their load currents. This new concept in power systems is often referred to as a "distributed power architecture." This type of power architecture can be implemented by means of a system rectifier which converts the ac line current into an unregulated or slightly regulated dc voltage, and numerous "point-of-load" power supplies. The point-of-load power supplies accept the dc voltage from the rectifier and produce a highly regulated dc voltage which is able to accommodate very large current transients (large di/dt).

The point-of-load power supplies need to be small, have a high power density, and be mountable on the circuit boards near the load. In addition, the point-of-load power supplies should be modular to allow two or more to be connected in parallel to supply power to high current loads. This modularity allows a single design to be adapted for loads with varying current requirements. The problem with placing power supply modules in parallel is getting the modules to share current effectively.

Small variances in component values or reference levels will cause one or two paralleled power supplies to supply the majority of load current while some of the remaining modules supply relatively little, or no, current. This disparity in load currents causes the modules supplying the majority of the current to wear faster due to the increased thermal stresses, leading to premature failures in the field. Accordingly, several methods have been tried to force parallel power supply modules to share load current evenly.

One prior method of current sharing was to replace the internal error reference voltages of each module, which control the duty cycles of the power supply module's switches, with a single system reference voltage generated by a common error amplifier. The disadvantages of this system are that it provides a single point of failure in that if the common error amplifier fails, then the entire power system fails. Additionally, it can be problematic to ship the bus error voltage to all of the power supply modules, and differences in the bus error voltage can appear at each module due to differing physical distances from the common error amplifier to the individual power supply modules.

Another method of current sharing involves master/slave schemes where the "master" module provides the control information used by each of the "slave" modules. These systems can provide adequate current sharing, but suffer from drawbacks. First, it requires two different types of power supply modules, a master module and a slave module. This reduces the advantages of modularity when two different parts must be used in manufacturing and repair. Next, there is again a single point of failure. If the master module fails the entire system is brought down because the slave modules cannot generate their own control signals. Additionally, the master/slave arrangement requires both an error voltage bus as well as a synchronization bus to synchronize the internal clocks of each module.

Accordingly, what is needed is an improved method and circuit to provide for current sharing between parallel power supply modules, and modular power supplies which incorporate this improvement.

SUMMARY OF THE INVENTION

The present invention provides a circuit and a method for providing current sharing between parallel power supplies using a modified master/slave scheme in which any of the parallel modules can be designated the master. A current-share circuit is incorporated into the controller of each power supply. The controller of each power supply produces an internal control signal that is used to regulate the output voltage of the power supply. Each of the parallel power supplies is interconnected to the other power supply modules on a current-share bus.

The current-share circuit includes a switch, which is operable to connect the power supply's internal control signal to the current-share bus when closed and disconnect the internal control signal from the current-share bus when open. The switch is controlled by master/slave logic, which determines whether the power supply is the master or a slave and controls the switch accordingly. Only the current-share bus is required to operate the modified master/slave scheme of the present invention, thereby eliminating the need for any type of synchronization line between the power supplies.

Any of the parallel power supplies can act as the master at any given time. The master is determined by closing all of the switches, thereby placing all of the power supplies internal control signals on the bus. The power supply whose control signal reaches the bus first becomes the master and the switches in the current-share circuit for all of the other parallel power supplies are then opened by the master/slave logic so that they become slaves.

Failures of the master module are accounted for by a pulse detector in the current-share circuit that monitors the current-share bus and determines whether a control signal has been missing from the bus for a predetermined amount of time which is greater than the cycle time of the power supplies. If the control pulse is missing for the predetermined amount of time, the pulse detector signals the master/slave logic, which then closes the switch so that another master/slave determination, or race to the current-share bus, can be made. Again, the first power supply that has its internal control signal placed on the current-share bus becomes the new master. Being able to designate a new master power supply prevents the single point of failure problem seen in other master/slave control schemes.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE DRAWINGS

Figure 1:
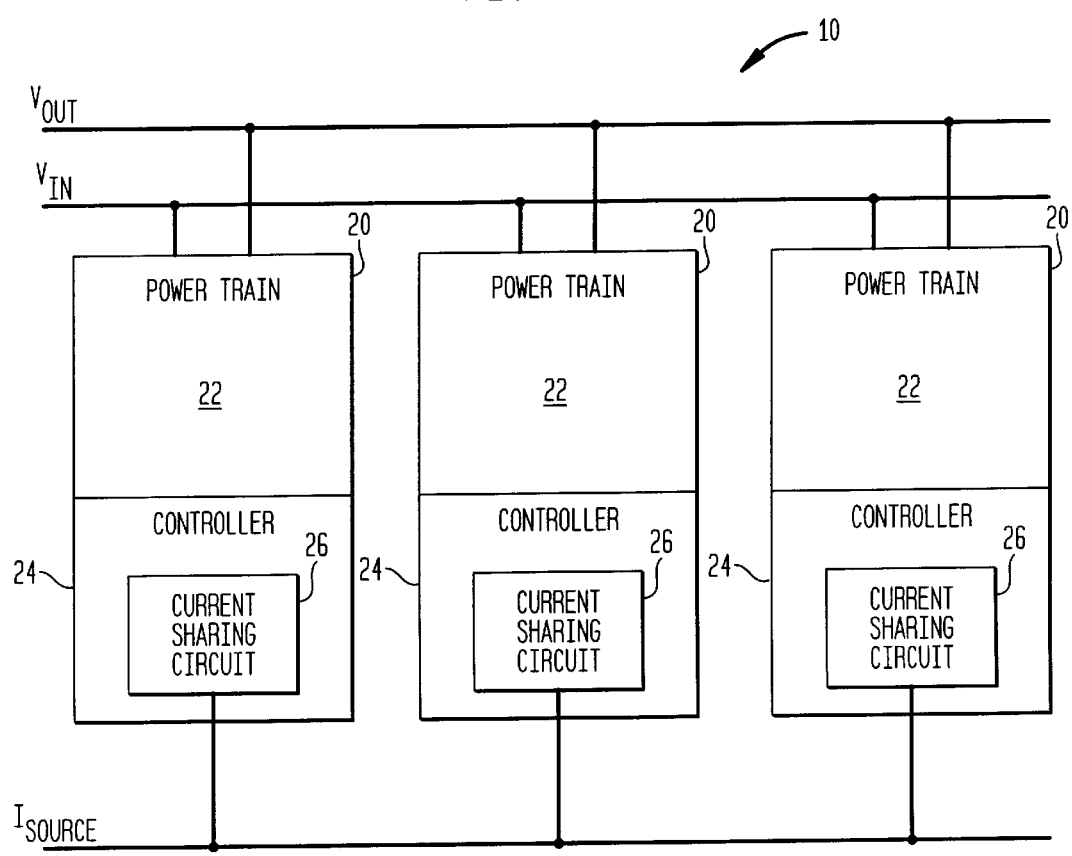
FIG. 1 is a block diagram of power system formed by multiple parallel power supply modules.

Referring now to FIG. 1, a power system 10 is shown which accepts an input voltage $V_{in}$ and converts the input voltage $V_{in}$ into a regulated output voltage $V_{out}$ which is used to power a load (not shown). Power system 10 is formed by a plurality of power supply modules 20, which are connected in parallel for increased current capacity over the current capacity of a single power supply module. In addition to input voltage $V_{in}$ and output voltage $V_{out}$ connections, the power supply modules 20 are interconnected along current-share bus $I_{share}$.

Without current-share bus $I_{share}$, power supply modules 20 would not evenly share the current provided to the load on the $V_{out}$ bus. One or more modules would likely operate in or near current limit while other power supply modules would supply little or no current. Those power supply modules supplying the majority of the load current would suffer much greater thermal stresses than the other modules and would be prone to premature failure. The current-share bus $I_{share}$, along with current-share circuit 26 discussed below, allow power supply modules 20 to work together to provide a load current that is evenly distributed between power supply modules 20.

A power train 22 and a controller 24 are included in each of the power supply modules 20. For power supply modules constructed according to the present invention, controller 24 includes current sharing circuit 26. Power train 22 operates to convert the input voltage $V_{in}$ into a tightly regulated output voltage suitable for powering a load. Power train 22 can be any suitable isolated or non-isolated, ac-to-dc, dc-to-dc, or dc-to-ac converter topology such as are well known in the art.

Power train 22 is controlled by controller 24, which acts to operate power train 22 in order to keep output voltage $V_{out}$ tightly regulated. Controller 24 can also be any suitable controller as are well known in the art, such as a pulse width modulated ("PWM") controller. For illustrative purposes only, the controller for the power supply module according to the present invention will be assumed to be a PWM controller. Controller 24 of the present invention includes current-share circuit 26, which is connected between controller 24 and the current-share bus $I_{share}$.

Current-share circuit 26, in each power supply module 20, uses current-share bus $I_{share}$ to operate power supply modules 20 in a modified master/slave scheme. In a master/slave current sharing scheme, one power supply module is a dedicated "master" which shares current information, usually in the form of an error signal, to the other power supply modules which are the "slave" modules. In the present invention's modified master slave scheme, there is no dedicated master module. Instead, the current-share circuit 26 allows each power supply module 20 to "race" to become the master by having each power supply module 20 place its internal control signal on the current-share bus $I_{share}$. Also, unlike standard master/slave schemes that place an error signal on the bus, the present invention's modified scheme has each module place its actual control signal, for example a PWM signal, on the current-share bus $I_{share}$.

Each current-share circuit 26 recognizes when another module's control signal has reached the bus before its own and acts to disconnect its power supply module's control signal from the bus, thereby becoming a slave to the master module for as long as the master continues to generate a control signal. If the master's control signal disappears from the bus, each current-share circuit reconnects its internal control signal to the bus for another race to become master. The operation of this control scheme will be discussed in greater detail below, particularly with reference to the timing diagram of FIG. 3.

Figure 2:
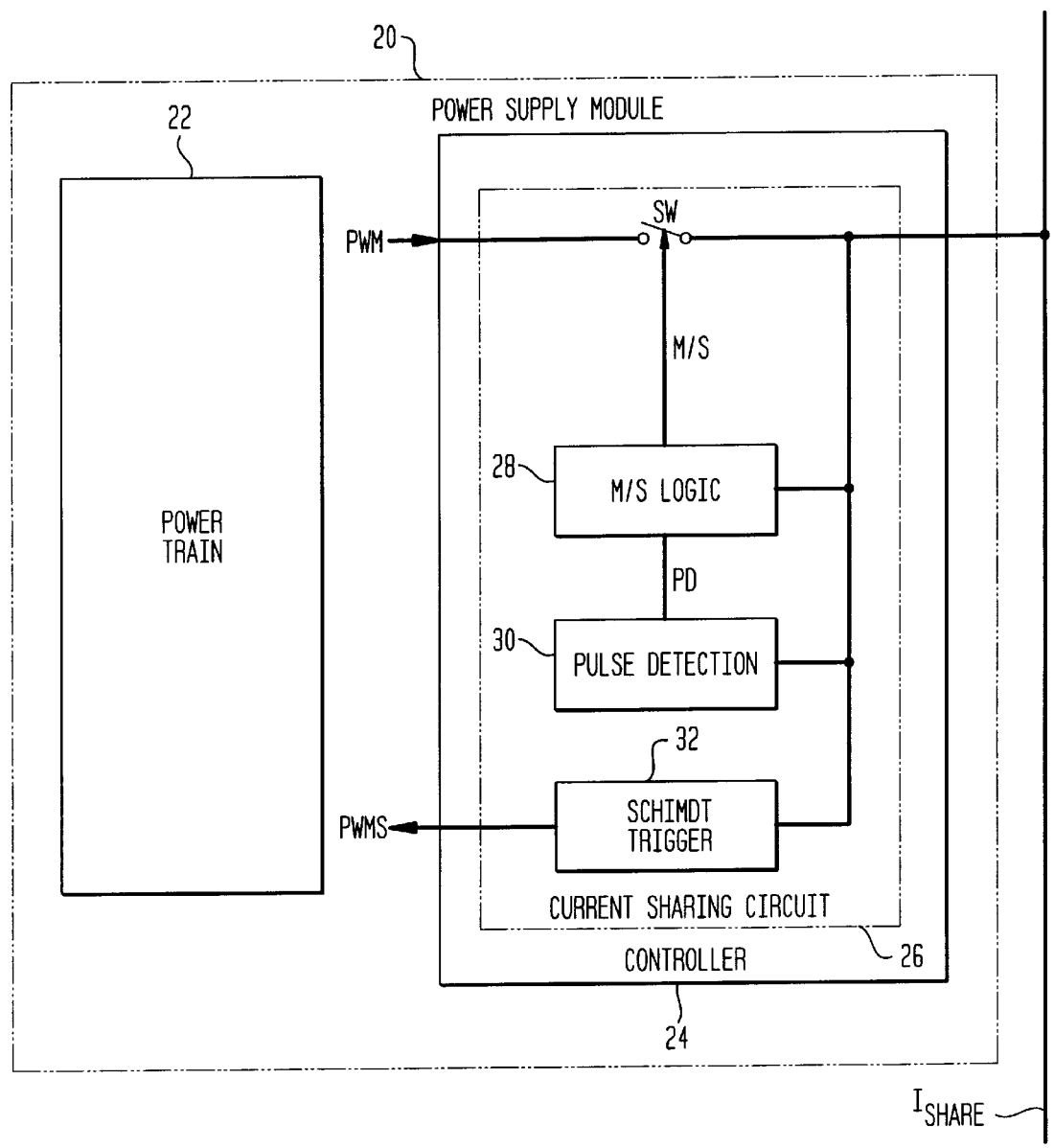
FIG. 2 is a block diagram of a current sharing circuit in accordance with the principles of the present invention.

Referring now to FIG. 2, a block diagram of current-share circuit 26 is shown in greater detail. As stated, current-share circuit 26 is part of controller 24 in power supply module 20. Current-share circuit 26 is formed essentially of switch SW, master/slave ("m/s") logic 28, and pulse detector 30. Switch SW is used to connect power supply module 20's internal control signal PWM to the current-share bus $I_{share}$ when power supply module 20 is acting as master or while a master/slave determination is being made. Switch SW is controlled by m/s logic 28 which determines, according to the outcome of the "race" to the bus during a master/slave determination, whether power supply module 20 is acting as a master or a slave. M/S logic 28 uses signal M/S to open switch SW when power supply module 20 is a slave and to keep switch SW closed when power supply module 20 is acting as the master.

Pulse detector 30 monitors current-share bus $I_{share}$ while power supply module 20 is operating and ensures that there is an operative control signal on the bus. A missing pulse on current-share bus $I_{share}$ indicates that the master module is no longer sending out its internal control signal and that a new master needs to be chosen. If pulse detector 30 fails to detect a pulse on current-share bus $I_{share}$, pulse detector 30 signals m/s logic 28 with signal PD which closes switch SW, thereby beginning another master/slave determination.

When power supply module 20 is acting as a slave it must take the control signal produced by the master module off current-share bus $I_{share}$ to operate power supply module 20's power train. Schmidt trigger 32 is used to provide a good edge to the incoming control pulses so that a good shared control signal PWMS is provided to the power supply module. One skilled in the art can easily understand that schmidt trigger 32 is not required to practice the present invention. Shared control signal PWMS could easily be taken directly off of current-share bus $I_{share}$ without any change in the scope of the invention.

Figure 3:
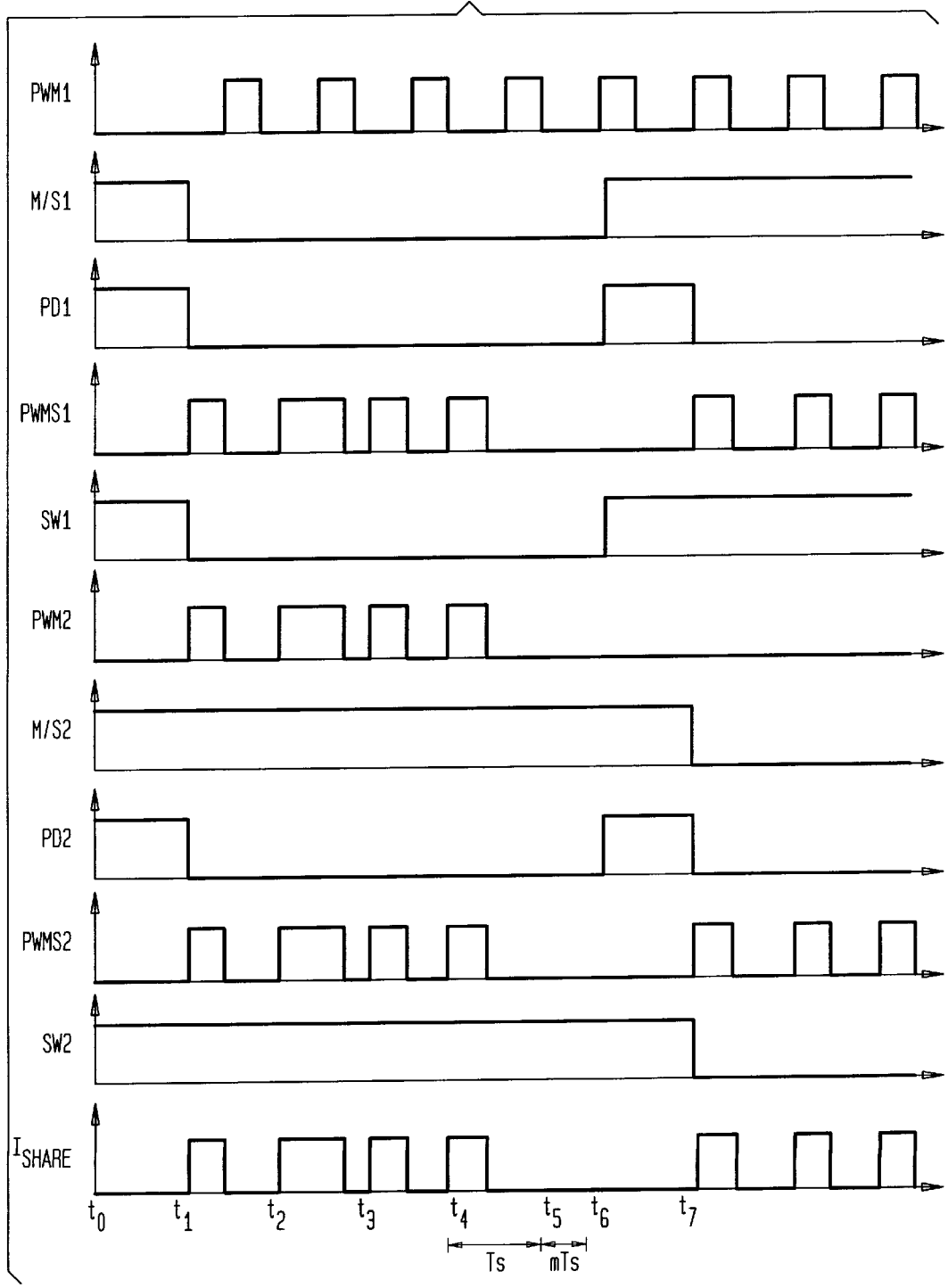
FIG. 3 is a timing diagram illustrating the operation of the current sharing circuit of FIG. 2.

Referring now to FIG. 3, the operation of the current sharing method of the present invention will be described. FIG. 3 is a timing diagram showing four internal signals and the switch state for each of two parallel power supply modules as well as the $I_{share}$ bus. The four signals, PWM, M/S, PD, and PWMS are shown with reference to FIG. 2, and a high state is used to indicate switch SW being closed while a low state indicates switch SW is open. The signals from the first module are designated with a 1 at the end of the signal name, and the second module's signals with a 2. While only two modules are described with reference to FIG. 3, one skilled in the art would easily understand that the operation described below applies to any number of modules in parallel. Additionally, the logic levels shown in FIG. 3 are arbitrary and for illustration only. One skilled in the art would understand that any or all of the logic signals shown could be reversed without affecting the scope or operation of the present invention.

At time $t_0$, the system is starting up and none of the modules have begun operating. At start-up both switches SW1 and SW2, are closed as a result of M/S1 and M/S2 being high, allowing their respective power supply module's control signal to be placed on current-share bus $I_{share}$ in preparation for a master/slave determination. Since there have yet to be any pulses appearing on current-share bus $I_{share}$, the pulse detection signals PD1 and PD2 are also driven high. At time ti the internal control signal PWM2 for the second power supply module appears on current-share bus $I_{share}$. The master/slave logic for the first power supply module detects the appearance of the pulse on the bus and opens switch SW1 making the first power supply module a slave to the second power supply module. With SW1 low the appearance of internal control pulse PWM1 at a time after $t_1$ is irrelevant to the operation of the system. The appearance of PWM2 on $I_{share}$ also drives PD1 and PD2 low.

Shared control signals PWMS1 and PWMS2 mirror $I_{share}$ and are used to control the power supply modules and insure proper current sharing. Since the second power supply module won the race, it has become master as indicated by M/S2 and SW2 remaining high. The system operates normally with the second power supply module acting as master through the pulses occurring at times $t_2$, $t_3$ and $t_4$.

Beginning at $t_5$ an illustration of a failure of the master power supply module is illustrated. At $t_5$ the pulse detectors for the power supply modules are expecting a pulse after the normal cycle $T_s$. After some fraction m of an additional cycle $T_s$ the pulse detectors for each power supply module detect the absence of a signal on $I_{share}$ and drive PD1 and PD2 high at time $t_6$. PD1 and PD2 going high signal the master/slave logic of each module to close the respective switches for another master/slave determination, shown by M/S1, M/S2, SW1, and SW2 all going high at time $t_6$.

With SW1 closed PWM1 is free to appear on $I_{share}$ and does so at time $t_7$. When PWM1 appears on $I_{share}$, M/S2 is driven low closing SW2, thereby making the second module a slave. As before, PWM1 appears on $I_{share}$, and on PWMS1 and PWMS2 for control of all the power supply modules. PD1 and PD2 are again driven low by the appearance of a pulse on $I_{share}$, and M/S 1 and SW1 stay high designating the first power supply module as the new master.

Figure 4:
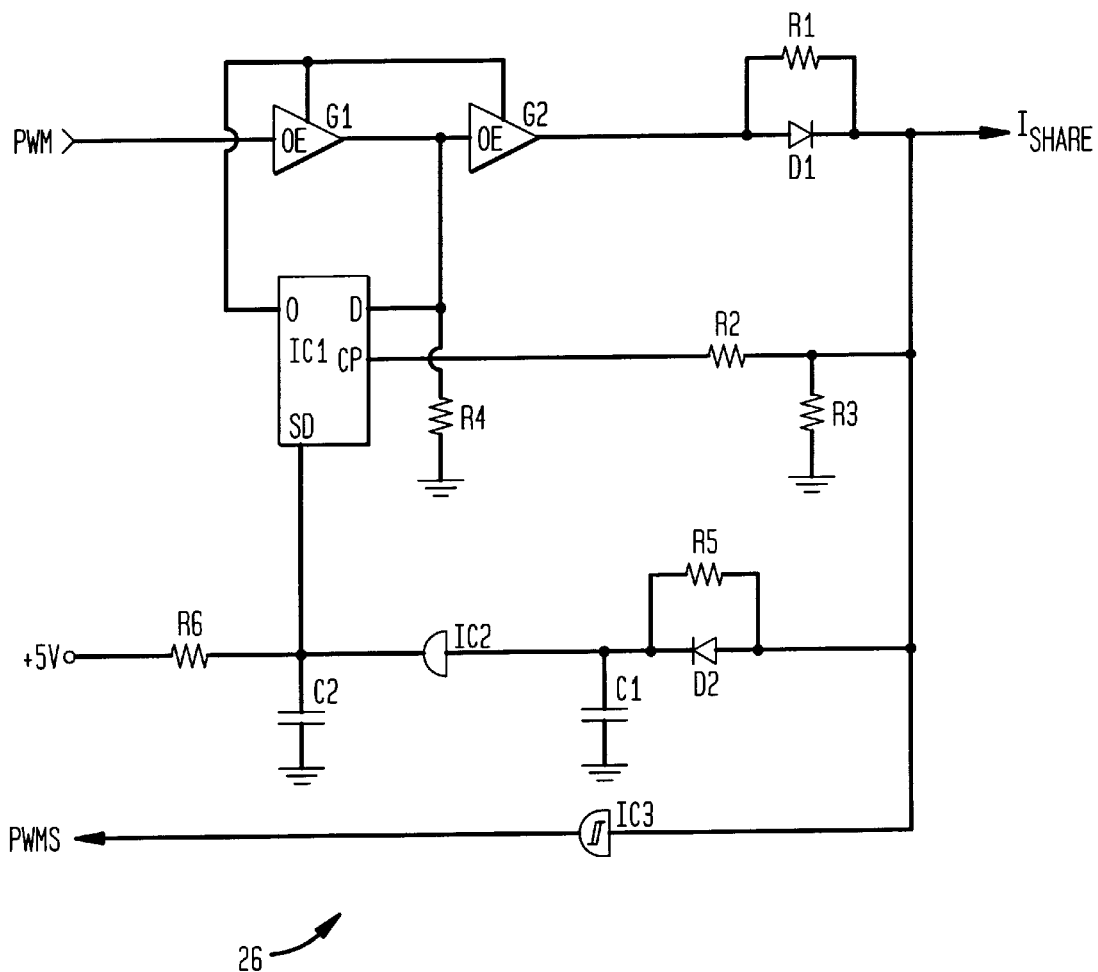
FIG. 4 is a circuit diagram showing the preferred implementation of the current sharing circuit of FIG. 2.

Referring now to FIG. 4 a circuit diagram is shown of a preferred implementation of current-share circuit 26 from FIGS. 1 and 2. Three state logic gates G1 and G2 are connected in series between internal control signal PWM and the $I_{share}$ bus and act as switch SW. IC1 is a common flip-flop and together with resistors R2 and R3 operates as m/s logic 28.

Three state logic gates G1 and G2 operate in their high impedance state, as an open switch, when pin OE, connected to the output of flip-flop IC1, of gates G1 and G2 is low or at a zero voltage. Clock pin CP of flip-flop IC1 is connected to $I_{share}$ through resistors R2 and R3. Resistor R2, in combination with the parasitic capacitance of flip-flop IC1 act to provide a delay between the appearance of a pulse on $I_{share}$ and the clocking of that pulse by flip-flop IC1. This delay is necessary so that the proper settle time is maintained at pin D of flip-flop IC1, which is connected to the node between gates G1 and G2 and tied to ground through resistor R4. Resistor R6 and capacitor C2 are connected to pin SD of flip-flop IC1 and used to provide the initial reset of flip-flop IC1 during start-up.

Pulse detector 30 from FIG. 2 is formed by latch IC2, resistor R5, diode D2 and capacitor C1. Resistor R5, diode D2 and capacitor C1 determine the delay in pulse detector 30 such that pulse detector 30 is activated if a pulse does not appear on $I_{share}$ for a full cycle $T_s$ plus a fraction of an additional cycle $mT_s$ as described in FIG. 3. Latch IC2 latches the state of pulse detector 30, which is then connected to pin SD of flip-flop IC1 to signal if a pulse is missing on $I_{share}$. When a pulse is missing capacitor C1 completely discharges, driving latch IC2 and pin SD of flip-flop IC1 low, which sets pin Q of flip-flop IC1 high, thereby causing pin OE of gates G1 and G2 also to go high as described above.

Shared control signal PWMS is supplied to the power supply module through schmidt trigger IC3. Schmidt trigger IC3 is used to insure that shared control signal PWMS has a good edge when supplied to the power supply module to prevent potential problems with the control of the power train. As previously stated, schmidt trigger IC3 is optional and shared control signal can be supplied to the power supply module directly off of $I_{share}$ without the need for additional conditioning.

Resistor R1 and diode D1 are connected between gate G2 and $I_{share}$. Resistor R1 is needed to gradually discharge the parasitic capacitance of $I_{share}$ when internal control signal PWM is zero. Since resistor R1 must be between internal control signal PWM and $I_{share}$, diode D1 is needed when internal control signal is not zero to prevent the signal on $I_{share}$ to be reduced by the resistor network that would be formed by the parallel modules. This is accomplished with diode D1 placed in parallel with resistor R1.

All of the elements shown in FIG. 4 are common electrical component s commonly available though any electrical component supplier. Those skilled in the art should understand that the previously described embodiments of power supply module 20, power train 22 and controller 24 are submitted for illustrative purposes only, and other embodiments capable of providing these functions, thus providing a regulated output voltage to a load from an input voltage, are well within the broad scope of the present invention.

Although the present invention has been described in detail, those skilled in the art should understand that they can make various changes, substitutions and alterations herein without departing from the spirit and scope of the invention in its broadest form.

I claim:

1. A current-share circuit in a power supply for improving current sharing between parallel power supplies which are interconnectable on a current-share bus, and where each parallel power supply generates an internal control signal, the current-share circuit comprising:

a switch connected between the internal control signal of the power supply and the current-share bus, the switch operable to place the control signal of the power supply on the current-share bus when closed and to disconnect the control signal of the power supply from the current-share bus when open; and master/slave logic connected to and controlling the switch, the master slave logic determining which of the parallel power supplies placed its internal control signal on the current-share bus first, the power supply becoming master and all of the other parallel power supplies becoming slaves and controlling the switch such that, when the switch is closed, the internal control signal is connected to the current-share bus when the power supply is master, and when the switch is open, the internal control signal is disconnected from the current-share bus when the power supply is a slave.

2. The current-share circuit of claim 1 further comprising a pulse detector connected to the master/slave logic to signal when a new master/slave determination must be made.

3. The current-share circuit of claim 2 wherein the pulse detector signals the master/slave logic when the current-share bus does not have a control pulse for a predetermined period, thereby signaling a failure of the master power supply.

4. The current-share circuit of claim 1 wherein the switch is formed by at least one three state logic gate.

5. The current-share circuit of claim 1 wherein the master/slave logic includes a flip-flop for controlling the switch.

6. The current-share circuit of claim 1 wherein the power supply is a board mountable power supply module.

7. The current-share circuit of claim 1 wherein the internal control signal is a pulse width modulated control signal.

8. A board mountable power supply module connectable in parallel with other power supply modules for converting an input voltage to a regulated output voltage, the parallel power supply modules interconnectable via a current-share bus, the board mountable power supply module comprising:

a power train operable to convert the input voltage into the regulated output voltage;

a controller connected to the power train and operable to regulate the output voltage by producing an internal control signal which controls the operation of the power train; and a current-share circuit further comprising a switch connecting the internal control signal to the current-share bus and thereby determining whether the power supply module acts as a master or a slave, master/slave logic controlling the switch, and a pulse detector connected to the master/slave logic to indicate when a new master/slave determination must be made, the master slave logic determining which of the parallel power supply modules placed its internal control signal on the current-share bus first, the power supply module becoming master and all of the other parallel power supply modules becoming slaves and controlling the switch such that, when the switch is closed, the internal control signal is connected to the current-share bus when the power supply module is master, and when the switch is open, the internal control signal is disconnected from the current-share bus when the power supply module is a slave.

9. The current-share circuit of claim 8 wherein the switch is formed by at least one three state logic gate.

10. The current-share circuit of claim 8 wherein the master/slave logic includes a flip-flop for controlling the switch.

11. The current-share circuit of claim 8 wherein the controller is a pulse width modulated controller and the internal control signal is a pulse width modulated control signal.

12. A method for sharing current between parallel power supplies which are interconnectable by a current-share bus, each of the power supplies including a controller producing an internal control signal and a current-share circuit which further includes a switch, master/slave logic controlling the switch, and a pulse detector connected to the master/slave logic, the method comprising:

a) placing the internal control signal of each of the parallel power supplies on the current-share bus by closing the switch of each of the current-share circuits;

b) determining which of the internal control signals reaches the current-share bus first using the master/slave logic; and c) disconnecting the internal control signals of the parallel power supplies whose internal control signal did not reach the current-share bus first by opening the respective switches, thereby designating the power supply whose internal control signal reached the current-share bus first as master and the other parallel power supplies as slaves.

13. The method of claim 12 further comprising:

d) monitoring the current-share bus with the pulse detector;

e) determining that a control pulse has been absent from the current-share bus for a predetermined amount of time; and f) signaling the master/slave logic to repeat steps (a) through (c).

14. The method of claim 13 wherein the predetermined amount of time is a control cycle plus a fraction of a second control cycle.

15. The method of claim 12 wherein the controller is a pulse width modulated controller and the internal control signal is a pulse width modulated control signal.

16. The method of claim 12 wherein the switch is formed by at least one three state logic gate.

17. The method of claim 12 wherein the master/slave logic includes a flip-flop.

* * * * *